Patented Aug. 5, 1941

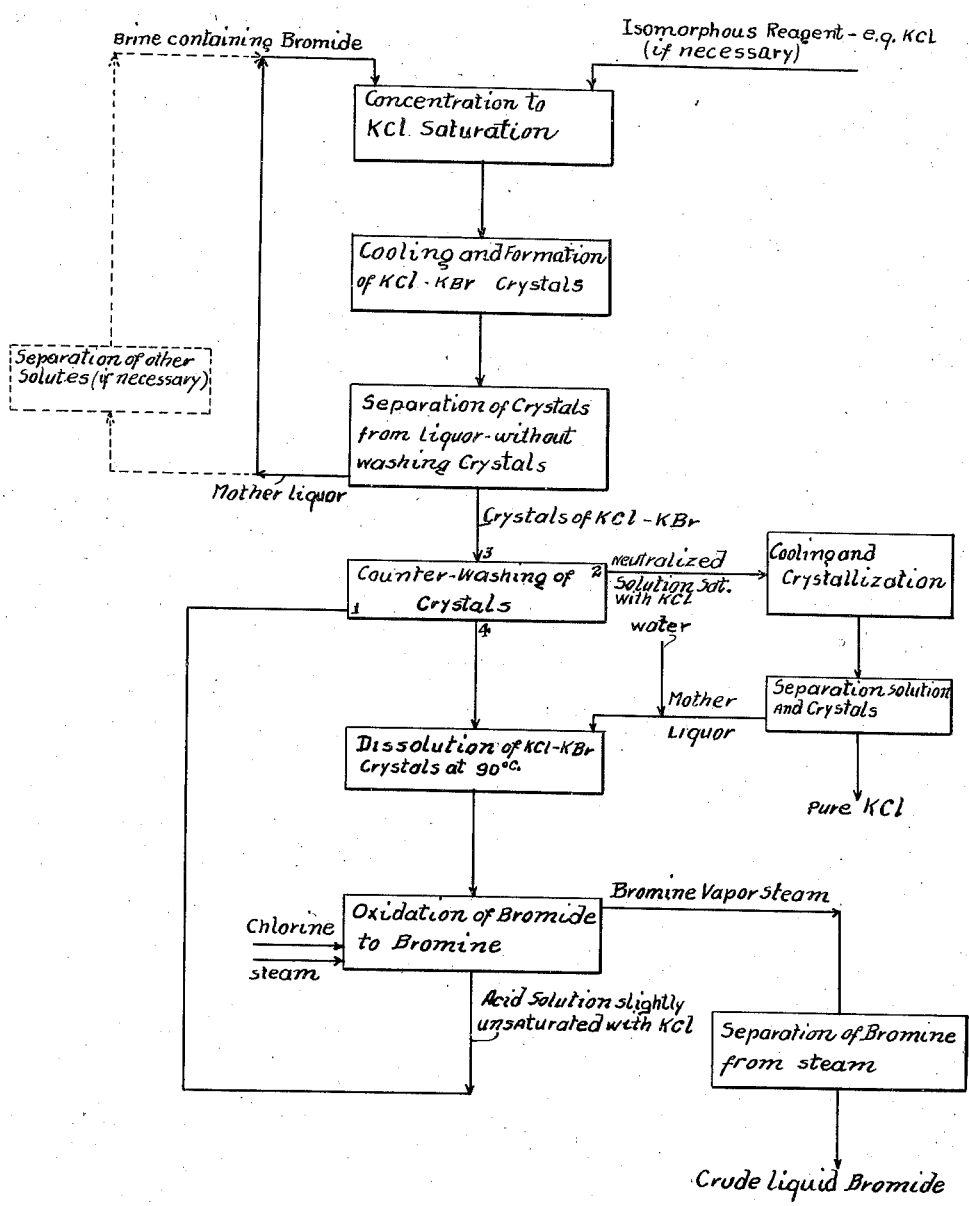

2,251,353

UNITED STATES PATENT OFFICE 2,251,353

PROCESS FOR RECOVERING BROMINE AND IODINE FROM ALKALINE BRINES

William A. Gale and Edward P. Pearson, Trona, Calif., assignors to American Potash & Chemical Corporation, Trona, Calif., a corporation of Delaware Application October 1, 1938, Serial No. 232,848

4 Claims. (Cl. 23—216)

The present invention relates to the recovery of bromine and iodine from alkaline brines, and has special reference to the recovery of bromine and iodine from alkaline brines, such as the brines from Searles or Owens Lake. The methods usually employed for the separation and recovery of bromine and iodine from solutions containing bromides or iodides are not satisfactory for application to alkaline solutions.

To recover bromine or iodine from alkaline solutions containing bromides or iodides, it is desirable, therefore, to first separate the bromides or iodides from the alkaline constituents of the brine. It is frequently desirable that bromine or iodine be recovered from an alkaline brine in which the bromide or iodide constitutes but a very small proportion of the total salts present. Thus, Searles Lake brine contains approximately 35% salts, but only about ⅛ of 1% of bromide. The manipulation of such brines to bring the bromide concentration to saturation so that the bromide can be crystallized in pure form is not practical, and the recovery of bromine from such brines must, therefore, depend upon other means.

The present invention is based on the fact that the bromides and iodides of potassium form crystals which are isomorphous with potassium chloride. When a solution which contains both potassium chloride and either potassium bromide or potassium iodide is manipulated so as to become oversaturated with respect to either of said salts, the two then tend to crystallize together from solution. Accordingly, in the process of the present invention, the bromide or iodide contained in an alkaline brine is first caused to be crystallized from the solution in the form of a mixed crystal with potassium chloride through, first, manipulating the brine to be treated to bring the same to over-saturation with respect to potassium chloride. The crystals thus obtained may then be separated from the alkaline brine and treated for the recovery of the desired bromine or iodine.

The present invention has been applied particularly to the recovery of bromine from Searles Lake brine, but the principles of the present invention may be readily applied to the recovery of bromine and iodine from other raw materials. In the case of Searles Lake brine the natural brine, when concentrated, contains a sufficient quantity of potassium chloride for precipitating the bromide content therewith as a mixed crystal. In the case of treatment of other sources of bromides or iodides it may be necessary to add to the material to be treated potassium chloride or other halogen compound which is isomorphous with the bromide or iodide to be recovered. It is also obvious that solid deposits containing bromides or iodides may be treated in accordance with the present invention by first preparing solutions of the solids which will contain the halides to be recovered.

Briefly, the present invention, as it is applied to Searles Lake brine, for example, comprises the initial treatment of the brine such as by concentration through evaporation to produce a liquor essentially saturated with potassium chloride, followed by the step of crystallizing isomorphous crystals of potassium bromide and potassium chloride free of alkaline substances from said liquor. The mixed crystals are then separated from the alkaline liquor and dissolved to form a saturated solution at an elevated temperature. This solution is then oxidized as, for example, by treatment with chlorine to liberate the bromine values. The bromine is removed from the solution with a suitable stripping gas and recovered from the gaseous mixture. The isomorphous reagent (potassium chloride) is then recovered from the debrominated liquor.

Mixed crystals are homogeneous crystals composed of two substances which are isomorphous, that is, have similar crystalline forms. They are single crystals or may be regarded also as solid solutions and occur when one of the isomorphous substances crystallizes from a solution containing both of them. Although homogeneous in character, their compositions vary through a series of values in which the relative proportions of the two substances can be gradually varied within certain limits, by varying the composition of the solution and the temperature of crystallization. In the case of some isomorphous substances, it is possible to obtain mixed crystals which vary in composition practically from 0 to 100% of either constituent; while in other cases, one of the components is always present as the minor constituent. More generally, isomorphous crystals are composed of a major and a minor constituent, the latter often being in the nature of an impurity. Hence, the major constituent may be considered as the "collector" reagent into which is absorbed the minor, albeit more valuable constituent. In the case of most naturally occurring bromide and iodide-containing solutions, the concentration of bromide or iodide is relatively low and mixed crystals obtained therefrom will contain only small percentages of these halides. It will be recognized, however, that this is not a serious handicap as commercial means of liberating these halogens have been adapted to the use of a raw material containing only small quantities of such halides.

Bromide-containing mixed crystals may be produced upon crystallization of a suitable collector reagent (any compound isomorphous with a bromide) from a solution containing both substances. The composition of such mixed crystals depends upon and varies with the concentration of the collector reagent and of the minor halide in the solution from which the crystals are obtained. Greater concentration of the minor halide will be obtained in the mixed crystals from solutions containing higher concentrations of that ingredient. For this reason, we prefer to grow the crystals from a solution which contains as high a concentration of the bromide (and/or iodide) as possible. Because of the considerable quantities of other salts with which the minor halides are sometimes associated, it may not always be practicable to provide solutions which have high concentrations of said minor halides, but in many cases some preliminary concentration of the solution will be possible. This may sometimes be conveniently combined with steps designed to recover other substances.

Formation of the mixed crystals may be effected by manipulating the collector saturated solution so that it becomes part of a system oversaturated with the collector. For example, crystals which do not contain any of the minor halides (bromide or iodide), or contain less thereof than is represented by the mixed crystal equilibrium in the system, may be added to the system and the solution allowed to approach or reach mixed crystal equilibrium therewith; or crystals of the collector may be formed in the solution by crystallization therefrom. The first method relies upon the fact that the halide free collector crystals added would be in only metastable equilibrium with the solution and would gradually "absorb" halide from the solution until equilibrium became established. In the second process, the collector crystals as formed will contain the isomorphous minor halide.

We prefer to crystallize the collector from the solution. Such crystallization will occur by concentrating the solution or by modifying its temperature so as to decrease the solubility of the collector reagent, or both. Crystallization will be continued preferably until the solution reaches saturation with some other solute or until it is no longer practical to continue the concentration or to modify the temperature.

Any substance which will form the desired mixed crystals containing the halide to be recovered may be used as the collector reagent so long as it does not react undesirably with other solutes in the solution. If the separation of minor halides is but one step in a process for producing a plurality of salts from the solution, the collector reagent must be chosen so as to avoid objectionable disturbance of the phase relations in the system. The reagent may be added to the solution containing the minor halide or it may be some compound already present in the solution. The controlling criterion is that there be provided a solution which is saturated with the isomorphous collecting reagent. If the reagent is already present in the solution in sufficient quantity, it is only necessary to fix the conditions so that said reagent can be caused to crystallize. When the reagent is not already available in the system, several methods of providing the solution with such reagent are available. The solution should contain the ions which make up the desired reagent and in proportion such that the system can be controlled to permit or to cause said collector to be present as a solid phase. Thus, one of the ions may be present already and there need be added only some compound which will supply the other ion. In other cases, both ions may need to be supplied to the solution. It may also be necessary in some cases to add other solutes to the minor halide-containing solution, which will provide such solution with a positive ion forming a soluble halide which can be removed isomorphously.

Naturally occurring bromides and iodides, as in solid deposits and brines, are usually those of the metals sodium and potassium, and they are commonly associated with large quantities of the chlorides of the same metals. This is of considerable advantage, particularly when there are present appreciable quantities of potassium chloride, as the chlorides, bromides and iodides of potassium are all isomorphous. Thus, bromides and iodides may be separated as mixed crystals with potassium chloride from solutions containing bromide or iodide and also from solutions containing both bromide and iodide. The range of compositions of the mixed crystals varies with the concentrations of the minor halides in the solution, the temperature, and the concentration of other solutes.

Provision, therefore, of sufficient chloride and potassium ions in a solution containing either bromide or iodide ions or both will permit the formation of mixed crystals of KBr and KCl and/or KI and KCl whenever the phase relations in the system are those in which KCl is a stable solid phase. Thus, such mixed crystals will result upon crystallization of potassium chloride from such solutions or upon adding to the solutions potassium chloride containing less of the minor halide than the equilibrium value.

In most cases, it will not be possible to separate a sufficient portion of the minor halides as mixed crystals to permit discarding of the remaining liquor. We prefer, therefore, to employ a cyclical process in which the mother liquor is returned to the cycle so that it is again treated for mixed crystal formation. Many naturally occurring raw materials containing bromides or iodides also contain large quantities of other compounds, such as chlorides, carbonates, sulfates, etc. In a cyclical process, provision must be made for the separation in each cycle of a quantity of each constituent of the raw material equal to the quantity thereof introduced in the cycle. This object may often be obtained simultaneously with the production of a concentrated halide-containing solution by evaporating the solution and removing solutes precipitated thereby. Chemical or other means of effecting separation of other values may be used, also, so long as such separation is achieved without undue loss of the minor halide values. The particular methods used to remove substances other than bromides and/or iodides will depend primarily upon the composition of the starting material, the components thereof which are economically recoverable, and the uses to which intermediate products may be put.

The present invention, together with various objects and advantages thereof, will best be understood from a description of a preferred form or example of the invention. For this purpose, we have hereinafter described a preferred example of the invention as applied to the treatment of Searles Lake brine.

The figure in the attached drawing is a flow sheet of the preferred process.

Searles Lake brine, as it is obtained from the lake bed at 22° C., has the following composition when the several elements and groups found by analysis are hypothetically combined in the form of compounds which may be separated from the brine:

|  | Per cent by weight |
|---|---|
| NaCl | 16.41 |
| Na$_2$SO$_4$ | 6.96 |
| Na$_2$CO$_3$ | 4.70 |
| Na$_2$B$_4$O$_7$ | 1.50 |
| KCl | 4.67 |
| KBr | 0.126 |
| Misc. and H$_2$O | 65.634 |
| Total | 100.000 |

It will be noted that this brine contains appreciable quantities of alkali metal salts of weak acids, as borates and carbonates; it also contains arsenates, phosphates and sulfides, which are grouped together in the analysis under "Misc." All of these salts form alkaline solutions. The separation of the bromide content of the brine from this alkaline medium and from most of the solutes with which it is associated is the primary purpose of the present invention. The first step in the process comprises the preparation of a suitable solution from which the isomorphous mixed crystals of potassium chloride and potassium bromide may be crystallized, i. e., a solution which is essentially saturated with potassium chloride so that it may be cooled to cause crystallization of the potassium chloride in the form of mixed crystals containing potassium bromide. This is accomplished by concentrating the Searles Lake Brine, together with mother liquor from a previous cycle, at high temperature until the brine becomes saturated or nearly saturated with potassium chloride. The concentration may be effected in various manners, as by the use of triple effect evaporators, and most desirable is carried out when in the final stage of evaporation the brine is brought to a temperature of about 100 to 110° C. During this concentration the chloride, sulfate, and carbonate of sodium largely precipitate in the form of solid salts and may be removed from the liquor containing the remaining constituents. The liquor, however, still contains appreciable quantities of carbonate, borate, and other alkaline ions and, therefore, remains alkaline in nature.

When the saturation with potassium chloride is reached at 100 to 110° C., the liquor will contain all of the potassium chloride and potassium bromide values of the original brine. It will also be saturated with burkeite sodium carbonate monohydrate and sodium chloride. Both the burkeite and the monohydrate exhibit invert solubilities, that is, become more soluble as the temperature decreases, so that none of these salts will crystallize upon cooling of the concentrated liquor. In solutions saturated with potassium chloride, sodium chloride exhibits an almost flat solubility curve, so that when such solutions produced at high temperatures are cooled, such crystallization proceeds without simultaneously precipitating appreciable sodium chloride. The concentrated liquor will also contain all of the borate values of the original brine, but will not be saturated with borates. The brine may be cooled to the saturation point of borax to crystallize potassium chloride and potassium bromide as mixed crystals without at the same time precipitating borates. If the cooling is carried below saturation with borax, then other means may be provided for separating the KCl—KBr mixed crystals and borax crops.

When other methods are used to effect separation of components of the brine other than the bromide, certain basic conditions must be met. Loss of bromide values is undesirable and, preferably, the removal of potassium values in a form other than potassium chloride is to be avoided; at least, the liquor should be allowed to retain sufficient potassium chloride to permit the preparation of a solution essentially saturated therewith from which the mixed crystals may be formed. The choice of a method of treatment will depend also primarily upon whether or not it is desired to separate other ingredients and, if so, the form in which they are desired.

A concentrated liquor substantially saturated with potassium chloride when produced by high temperature evaporation of Searles Lake brine and mother liquor from a previous cycle will vary to some extent in composition with variations in the proportions of mother liquor and raw brine used and in the composition of the brine. With a brine of composition similar to that given above, and when all of the subsequent mother liquor is returned to the system, a hot concentrated solution will be obtained at 100–110° C., which has a composition similar to the following:

|  | Per cent by weight |
|---|---|
| KCl | 19.61 |
| NaCl | 6.76 |
| Na$_2$CO$_3$ | 6.37 |
| Na$_2$SO$_4$ | 1.38 |
| Na$_2$B$_4$O$_7$ | 9.49 |
| KBr | 1.11 |
| Na$_2$S | 0.74 |
| Na$_3$PO$_4$ | 1.68 |
| Na$_2$AsO$_4$ | 0.73 |
| Misc. and H$_2$O | 52.11 |
| Total | 100.00 |

The concentrated liquor is then cooled, to say, 35–40° C., and a crop of mixed crystals of KCl and KBr essentially free of any substance save a little sodium chloride is obtained. Upon completion of the cooling, we pass the sludge of mother liquor and isomorphous salt crystals, by gravity flow, to a settler in which the greater part of the liquor is removed from the crystals. A sludge of crystals is drawn off from the bottom of the settler and passed to suitable means, such as filters, centrifugals or the like, for completing the separation of the liquor values from the isomorphous salts. It is the usual practice to wash the salts on the filter or centrifugal to complete the removal of the alkaline mother liquor. In accordance with one feature of our invention, we prefer to allow the isomorphous salt mixture to retain a little mother liquor which serves a useful function in a subsequent step of our process.

Following the separation and recovery of the isomorphous salts, there remains a mother liquor which contains a considerable content of bromide and also of valuable potassium chloride, borax, etc., and it is desirable to return it to the evaporation process to facilitate further recovery of such values. Before returning this mother liquor to the evaporation cycle, however, a quantity of borax is removed and recovered. This borax may be conveniently removed by a further cooling of the liquor, to say 24–27° C., together with agitation to release the supersaturation of the borax. When the borax so crystallized has been separated from this second mother liquor, the latter is returned to the evaporation step.

From a concentrated liquor having a composition similar to that given above, mixed KCl-KBr crystals of the following average composition were obtained upon cooling to 35–40° C.:

|  | Per cent |
|---|---|
| KCl | 95.51 |
| KBr | 1.68 |
| NaCl | 1.70 |
| Misc | 1.09 |
| Total | 100.00 |

The impurities reported under "Misc." in the above analysis include small quantities of other compounds present in the liquor. These impurities will be present partially as a result of incomplete removal of mother liquor from the salts and partly as a result of crystallization during the cooling step. They comprise small amounts of sodium carbonate, sodium sulfate, sodium tetraborate, water, etc.

The return of mother liquor containing unrecovered halide values will build up the concentration of the minor halide in the concentrated liquor until there is as much removed each cycle as enters in the cycle. In practical operation, there will always be small liquor losses which will represent loss of quantities of valuable constituents. It may be advantageous, in some cases, to recover additional halide before returning the mother liquor to the cycle. This may be accomplished, for example, by again adding isomorphous collector reagent to the mother liquor and recovering a second crop of mixed crystals. Whether this expedient is desirable depends upon a comparison of the cost of the second manipulation with reagent and the value of the bromine lost due to higher concentration of bromide in the cycle.

The formation of mixed crystals containing bromide or iodide to effect separation thereof from other values with which they are normally associated and from which direct separation in pure form is difficult comprises a primary object of our invention. By such means, we are able to obtain the bromide or iodide in a form from which the preparation of the corresponding halogen is much simplified. For example, mixed crystals of KCl and KBr free of all but a trace of alkaline compounds comprise a form of bromine salts to which well-known processes of recovering bromine may be efficiently applied. The recovery of the halogen should, however, be carried out so that it is also possible to recover the isomorphous collecting reagent. When the latter is a constituent of the raw material, its final recovery will represent an additional product in marketable form, while in those processes in which the reagent is added to the system, it may be re-used after separation from the minor halide. Further features of our invention have been developed and provide for the recovery of both the isomorphous collector reagent and bromine in refined form.

The recovery of bromine and the collector may be combined in a cyclical process which involves only readily controlled steps and provides complete recoveries of both ingredients. The first step of our process comprises the preparation of a solution of the mixed crystals from which bromine is liberated by oxidation with chlorine in a countercurrent oxidation tower. The bromine is separated from the solution by blowing out with steam and the collector reagent is obtained from the solution by crystallization. To facilitate the recovery of a large crop of said reagent in each cycle and the handling of as little liquor as possible in the halogen liberation step, we prepare a concentrated solution of the mixed crystals and preferably one which is saturated with the collector reagent at an elevated temperature.

The preparation of the solution at an elevated temperature is especially advisable when steam is used for blowing out the bromine after its liberation with chlorine. As appreciable condensation of steam will take place in the tower when the solution therein is greatly below the boiling point, we prefer to prepare the solution at a temperature of 90° C., or higher, and thereby reduce the quantity of steam needed in the tower.

In the usual process for the recovery of bromine by oxidation of bromides with chlorine and blowing out with steam, it is customary to acidify the solution containing the bromides prior to the treatment with chlorine. In that way, bromate formation is avoided. Our mixed crystals will usually contain minor percentages of alkaline reacting impurities unless they are thoroughly washed. Normally, such impurities would be neutralized before treatment with chlorine. We allow the mixed crystals to retain a minor percentage of such alkaline impurities as said impurities may be caused to serve a useful purpose.

Solution from the counter-current oxidation towers, that is, which has been treated to liberate bromine and from which the bromine has been blown out with steam is appreciably corrosive to steel and other metal surfaces. This corrosive nature is probably due to small quantities of chlorine. Ordinarily, it would be destroyed by the addition of some reagent, such as sodium thiosulfate, before being transferred through steel pipes for other treatment.

Instead of adding a neutralizing reagent for this purpose, we counter-currently treat the tower end liquor with the incoming mixed crystals when the latter have been allowed to retain a minor quantity of alkaline reacting substances. The acidity of the liquor is neutralized by the alkaline values of the salts, leaving a liquor which is essentially neutral and salts which are neutral or only slightly basic in character. By this expedient, we usefully combine two features which are otherwise disadvantageous. That is, the necessity for providing steps for acidifying the solution of the mixed crystals and for neutralizing the acidity of the debrominated liquor are simultaneously eliminated.

Counter-current washing of the incoming salts with the hot, nearly saturated, tower end liquor serves a further useful purpose. This liquor becomes slightly undersaturated with the isomorphous collector reagent during its passage through the tower due primarily to the condensation of steam during the blowing out process. Due to the dilution resulting from this condensation, the tower end liquor dissolves a small amount of the crude salts during this counter treatment, and this completes the saturation of the liquor with respect to the collector reagent. Although the tower end liquor or debrominated liquor is essentially free of bromide, only a relatively small amount thereof will (during this step) be leached from the isomorphous salts or mixed crystals. Further to this end, we so arrange the process that the time of contact during the counter washing is insufficient to permit equilibrium to be obtained. Essentially, only that quantity of bromide will be dissolved as is associated with the collector which goes into solution.

In the usual manner, the mixture of steam and elemental bromine from the top of the oxidation, or debrominating, tower is cooled and condensed under controlled conditions to effect a separation of the water and liquid bromine. The latter may contain small quantities of impurities and these are removed by refining steps, if desired.

The counter-washed hot liquor is saturated with the collector reagent. The latter is recovered by cooling the liquor and causing crystallization of the reagent. Mother liquor remaining from the crystallization can be recycled to the mixed crystal dissolution step and a cycle thereby established in which the collector is essentially all recovered. At times it may be economical or advisable to evaporate the cold mother liquor instead of recycling it. This could be done either separately or in conjunction with the original raw brine evaporation step in which, in this example, the Searles Lake brine is concentrated to saturation with potassium chloride. The latter alternative is especially attractive in certain instances of plant practice wherein it is customary and necessary to use a "dilution water" consisting of an aqueous medium containing essentially only potassium chloride with small quantities of potassium bromide.

While the particular process herein described is well adapted to carry out the objects of the present invention, it is to be understood that various modifications and changes are included as coming within the scope of the appended claims.

We claim:

1. The process of recovering bromine from Searles Lake brine, which comprises concentrating the brine essentially to saturation with potassium chloride, cooling the concentrated liquor and crystallizing mixed crystals of potassium chloride and potassium bromide, separating the mixed crystals from the solution, dissolving said crystals to form an aqueous solution thereof, oxidizing the bromide contained in the solution to bromine and recovering the bromine, counter-washing said mixed crystals with debrominated solution prior to dissolving them and crystallizing potassium chloride from the debrominated solution.

2. A process of recovering a halogen of higher molecular weight than chlorine from mixed salts containing a halide of said halogen, potassium chloride and an alkaline compound, which comprises first contacting said mixed salts with a mother liquor from a previous operation, which mother liquor is substantially free of said halogen and relatively acid as compared with said mixed salts whereby to neutralize the alkaline values of said mixed salts, said contact between said mixed salts and mother liquor being so conducted as to avoid dissolving a material quantity of said halogen from said mixed salts, separating said mixed salts from said mother liquor, dissolving said mixed salts to form an aqueous solution thereof, oxidizing the same to free said halogen content while simultaneously relatively acidifying the mother liquor, separating the liberated halogen from the mother liquor, and returning the mother liquor to said aforesaid contact with said mixed salts.

3. A process of recovering bromine from solutions containing potassium bromide, potassium chloride and an alkaline compound, which process comprises crystallizing from solution mixed crystals of potassium chloride and potassium bromide, separating said mixed crystals from solution, freeing said mixed crystals from alkaline values by contact with the mother liquor from a previous operation while avoiding material solution of bromide values in said mother liquor, separating the mixed crystals from the mother liquor, dissolving the mixed crystals to produce a concentrated solution of potassium chloride containing potassium bromide, oxidizing and acidifying the solution to liberate bromine, removing the bromine from the solution and forming a mother liquor substantially saturated with potassium chloride and substantially free of bromine values and acidic as compared with said mixed crystals, and returning said mother liquor to said previously mentioned operation.

4. A process of recovering a halogen of higher molecular weight than chlorine from a complex alkaline brine containing a halide of said halogen, and potassium chloride with other salts including alkaline salts, which comprises concentrating the brine essentially to saturation with potassium chloride, cooling the concentrated liquor and crystallizing mixed crystals of potassium chloride and the potassium halide of said halogen to be recovered, separating said mixed crystals from solutions, freeing said mixed crystals from entrained alkaline compounds by contact with the mother liquor from a previous operation without essentially dissolving any of the halogen value in said mother liquor, separating the mixed crystals from said mother liquor, dissolving the mixed crystals to form an aqueous solution substantially saturated in potassium chloride, oxidizing the aqueous solution to liberate halogen, separating halogen from the resulting mother liquor, and returning the mother liquor to said aforesaid operation.

WILLIAM A. GALE.
EDWARD P. PEARSON.